United States Patent
Karlsson et al.

(10) Patent No.: US 9,391,504 B2
(45) Date of Patent: Jul. 12, 2016

(54) CONTROL OF TRANSFORMER FLUX DENSITY IN AN ISOLATED SWITCHED MODE POWER SUPPLY

(75) Inventors: Magnus Karlsson, Oskarshamn (SE);
Mikael Appelberg, Gothenburg (SE);
Oscar Persson, Kalmar (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 15 days.

(21) Appl. No.: 14/377,756

(22) PCT Filed: Feb. 9, 2012

(86) PCT No.: PCT/EP2012/052186
§ 371 (c)(1),
(2), (4) Date: Aug. 8, 2014

(87) PCT Pub. No.: WO2013/117226
PCT Pub. Date: Aug. 15, 2013

(65) Prior Publication Data
US 2015/0003116 A1    Jan. 1, 2015

(51) Int. Cl.
*H02M 3/337* (2006.01)
*H02M 1/40* (2007.01)
*H02M 3/335* (2006.01)

(52) U.S. Cl.
CPC ............ *H02M 1/40* (2013.01); *H02M 3/33538* (2013.01); *H02M 3/3378* (2013.01); *H02M 3/33592* (2013.01); *Y02B 70/1475* (2013.01)

(58) Field of Classification Search
CPC .......... H02M 1/40; H02M 2001/0003; H02M 3/335; H02M 3/33523; H02M 3/33553; H02M 3/33538; H02M 3/33546
See application file for complete search history.

(56) References Cited

U.S. PATENT DOCUMENTS 4,847,743 A * 7/1989 Kamiyama ....... H02M 7/53875
                                                363/132
5,717,305 A * 2/1998 Seibel ................. H02P 21/0032
                                                318/432

(Continued)

FOREIGN PATENT DOCUMENTS

| EP | 2393190 | 12/2011 |
|---|---|---|
| WO | WO-2012116750 | 9/2012 |
| WO | WO-2013113354 | 8/2013 |

OTHER PUBLICATIONS

Erickson, Robert W. and Maksimovic, Dragan. Fundamentals of Power Electronics. 2004, Kluwer Academic Publishers. 2$^{nd}$ Edition. pp. 491-537.*

(Continued)

*Primary Examiner* — Harry Behm
*Assistant Examiner* — Peter Novak
(74) *Attorney, Agent, or Firm* — NDWE LLP

(57) ABSTRACT

A control circuit generates a control signal to control a duty cycle of a switched mode power supply such that the magnetic flux density in the transformer is balanced, thereby preventing saturation of the transformer core. This permits the use of unsymmetrical duty cycles within the switch cycle. The control circuit comprises a flux density calculator and a regulator. The flux density regulator receives a signal indicative of the input voltage of the switched mode power supply and a feedback signal comprising the generated control signal, and it generates therefrom an average flux density signal. The regulator receives the generated average flux density signal and a signal indicative of the output voltage of the switched mode power supply, and generates the control signal in dependence upon the average flux density signal, the reference flux density signal, the signal indicative of the output voltage and a reference voltage signal.

16 Claims, 17 Drawing Sheets

(56) References Cited

U.S. PATENT DOCUMENTS

| | | | |
|---|---|---|---|
| 5,940,281 A | | 8/1999 | Wolf |
| 5,940,286 A | * | 8/1999 | Harmoinen ......... H02P 21/0035 318/432 |
| 7,269,034 B2 | | 9/2007 | Schlecht |
| 7,272,021 B2 | | 9/2007 | Schlecht et al. |
| 7,558,083 B2 | | 7/2009 | Schlecht |
| 7,564,702 B2 | | 7/2009 | Schlecht |
| 7,787,261 B2 | | 8/2010 | Farrington et al. |
| 2007/0096706 A1 | | 5/2007 | Terakado et al. |
| 2010/0231183 A1 | | 9/2010 | Jan et al. |
| 2011/0299304 A1 | * | 12/2011 | Coley ...................... H02M 1/40 363/21.09 |

OTHER PUBLICATIONS

PCT International Search Report for Counterpart Application No. PCT/EP2012/052186, (Nov. 2, 2012), 3 pages.

PCT Notification of Transmittal of the International Preliminary Report on Patentability for Counterpart PCT Application No. PCT/EP2012/052186, (Mar. 21, 2014), 5 pages.

PCT International Preliminary Report on Patentability (Chapter II), Application No. PCT/EP2011/053177, (May 10, 2013), 14 pages.

PCT International Search Report, Application No. PCT/EP2011/053177, (Feb. 1, 2012), 3 pages.

PCT Written Opinion of the International Searching Authority, Application No. PCT/EP2011/053177, (Sep. 3, 2013), 5 pages.

PCT International Search Report, Application No. PCT/EP2012/051429, (Nov. 2, 2012), 4 pages.

Barry, M., "Design Issues in Regulated and Unregulated Intermediate Bus Converters", *Applied Power Electronics Conference and Exposition, APEC '04, Nineteenth Annual IEE*, (2004), pp. 1389-1394, vol. 3.

Hang, et al., "A Simple Control Algorithm to Avoid Flux Density Bias in Isolated Full-Bridge Topologies", *Industrial Electronics, IECON '09, 35th Annual Conference of IEEE*, (2009), pp. 100-103.

Written Opinion, Application No. PCT/EP2012/052186, dated Nov. 2, 2012, 4 pages.

\* cited by examiner

CONTROL OF TRANSFORMER FLUX DENSITY IN AN ISOLATED SWITCHED MODE POWER SUPPLY

CROSS-REFERENCE TO RELATED APPLICATIONS

This application is a National stage of International Application No. PCT/EP2012/052186, filed Feb. 9, 2012, which is hereby incorporated by reference.

TECHNICAL FIELD

The present invention generally relates to the field of switched mode power supplies (sometimes referred to as switch mode power supplies or switching mode power supplies) and more specifically to the control of the transformer flux density of an isolated switched mode power supply.

BACKGROUND

The switched mode power supply (SMPS) is a well-known type of power converter having a diverse range of applications by virtue of its small size and weight and its high efficiency. For example, SMPSs are widely used in personal computers and portable electronic devices such as mobile phones. An SMPS achieves these advantages by switching a switching element, such as a power MOSFET, at a high frequency (usually tens to hundreds of kHz), with the frequency or duty cycle of the switching defining the efficiency with which an input voltage is converted to a desired output voltage.

FIG. 1 depicts a standard isolated SMPS with a number of switching devices Q1-Q6. The voltage across the primary side of the transformer T1 is controlled using switching devices Q1-Q4. Rectification of the voltage across the secondary side of the transformer T1 is achieved using switching devices Q5 and Q6.

As depicted in FIG. 1, the switching devices on the primary side of the isolated SMPS Q1-Q4 are in the full-bridge configuration. Other common primary side topologies are half-bridge and push-pull.

FIG. 1 also depicts a standard topology for the secondary side of transformer T1 in isolated SMPSs using a centre-tapped transformer. This yields full wave rectification using only two switching devices on the secondary side of the transformer T1 in contrast with a single secondary winding and full bridge using four switching devices for full-wave rectification. It is to be noted that the switching devices Q1-Q6 have an internal body drain diode which is not shown in the switching device symbol. The switching devices are not limited to the use of N-MOSFETs, P-MOSFETs or IGBT, as other types can be used.

A limitation of isolated SMPSs is that, to prevent saturation, the magnetic flux of the transformer must be kept balanced. Traditionally, to balance the magnetic flux, symmetrical duty cycles in a full switch cycle are used.

More particularly, a timing diagram for symmetric duty cycle switching is shown in FIG. 2. If $D_1$ and $D_2$ are the duty cycles for the switching device pairs Q1/Q4 and Q2/Q3, respectively then the switch period is denoted with T. In order to have the transformer magnetic flux balanced, the on-times for Q1/Q4 and Q2/Q3 should be identical in each switch period. Hence, the duty cycles $D_1$ and $D_2$ should be identical. A full switch cycle using such a scheme is set out below:

1 Time period: 0 to $D_1T/2$: Q1/Q4 is conducting and energy transferred to the secondary side from the input source.

2. Time period: $D_1T/2$ to T/2: Both Q5 and Q6 are conducting and the current is freewheeling through both the secondary side windings in order to have the transformer flux balanced.

3. Time period T/2 to $T/2+D_2T/2$: Q2/Q3 is conducting and energy is transferred to the secondary side.

4. Time $T/2+D_2T/2$ to T: same as in 2.

One problem, however, with balancing the magnetic flux using a symmetrical duty cycle is that the control loop must be run at half of the switching frequency, which yields a poor load transient response. That is, the constraint of maintaining the duty cycles, $D_1$ and $D_2$, as identical in a switch cycle yields a halved bandwidth of the output voltage control compared to a situation without this restriction. This yields a poor load transient response, which requires a large capacitive decoupling bank at the output in order to keep the voltage deviations during transients at acceptable levels.

On the other hand if the duty cycles are permitted to be asymmetric, so varying within the switch cycle, then the magnetic flux in the transformer must be balanced in another way, i.e., not only the output voltage but also the magnetic flux density must be regulated. This requires an increase in the controller complexity. An industry standard PID controller can not handle such a MIMO system.

SUMMARY

In view of the problems in known SMPS control strategies, the present invention aims to provide an apparatus and method for generating a control signal to control the duty cycle of an SMPS in such a way that the magnetic flux density of the SMPS is balanced.

According to the present invention there is provided a control circuit operable to generate a control signal to control the duty cycle of a switched mode power supply. The control circuit comprises a flux density calculator and a regulator. The flux density calculator is operable to receive a feedback signal comprising the control signal generated by the control circuit and is operable to generate an average flux density signal dependent upon the fedback control signal. The regulator is operable to receive the generated average flux density signal and is operable to generate the control signal to control the duty cycle of the switched mode power supply in dependence upon the average flux density signal and a reference flux density signal.

Furthermore, the present invention provides a switched mode power supply having such a control circuit.

Yet further, the present invention provides a control method of generating a control signal to control the duty cycle of a switched mode power supply. The method comprises receiving a feedback signal comprising a previously generated control signal, generating an average flux density signal dependent upon the fedback control signal, and generating a control signal to control the duty cycle of the switched mode power supply in dependence upon the average flux density signal and a reference flux density signal.

These features provide a number of advantages. For example, because the magnetic flux density in the transformer of the SMPS is balanced by the duty cycle control signal, the duty cycle is not required to be symmetrical, and can now can be asymmetrical, giving an improved response to load transients.

The features also enable an embodiment to be implemented as a MISO system that is controlled using state-space techniques.

However, simpler and more common control techniques, like two parallel PID controllers, work.

BRIEF DESCRIPTION OF THE DRAWINGS

Embodiments of the invention will now be described, by way of example only, with reference to the accompanying drawings in which.

DETAILED DESCRIPTION OF EMBODIMENTS

As will be explained in detail below, embodiments of the present invention incorporate a control strategy for a switched mode power supply that maintains balanced magnetic flux density in the transformer in order to prevent saturation of the transformer core. This permits the use of unsymmetrical duty cycles within the switch cycle resulting in an improved load transient response.

Figure 1:
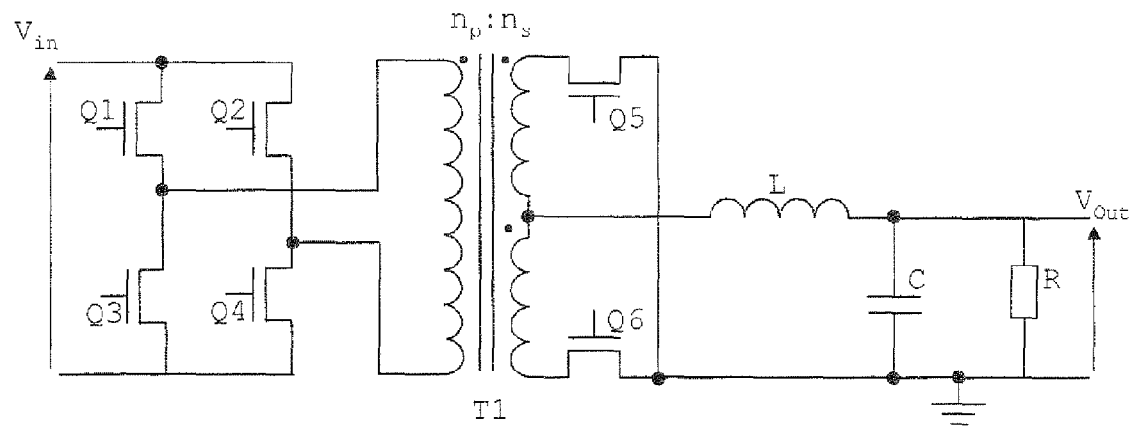
FIG. 1 shows a circuit diagram of a known DC-DC isolated switched mode power supply.
Figure 2:
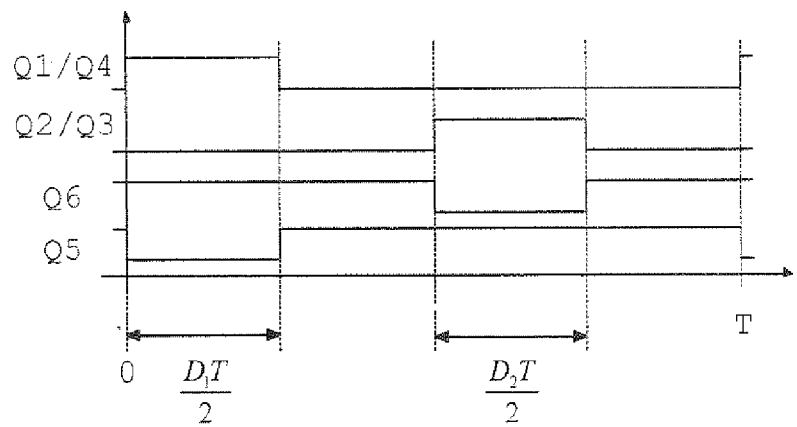
FIG. 2 shows a timing diagram with symmetrical switching of the duty cycles for the switching devices of the switched mode power supply depicted in FIG. 1.
Figure 3:
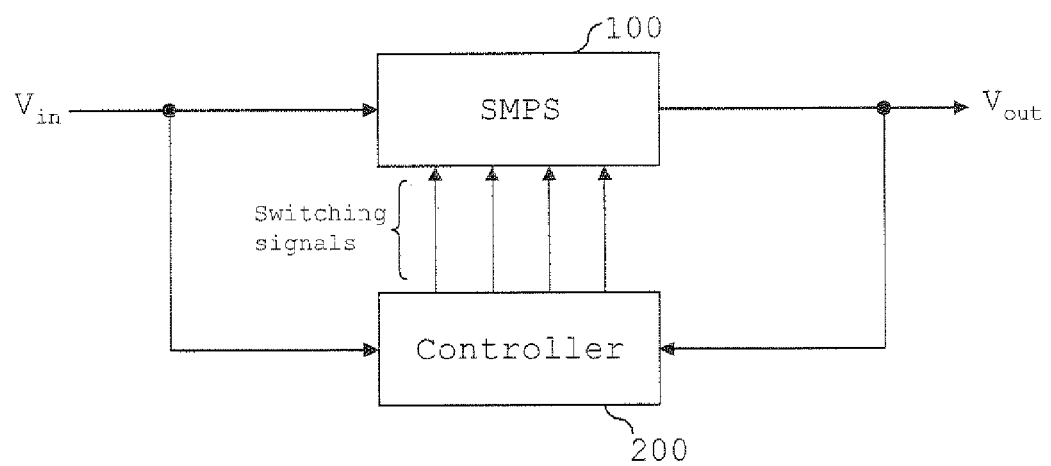
FIG. 3 is a block diagram of a switched mode power supply and a control circuit according to a first embodiment of the present invention for generating a control signal for controlling the switched mode power supply.

FIG. 3 depicts a top-level block diagram of a switched mode power supply (SMPS) 100 and control circuit 200 according to a first embodiment. In the present embodiment, the control circuit 200 is arranged to generate duty cycle control signals to regulate both the magnetic flux density and also the output voltage of the SMPS 100. However, regulation of the output voltage is not essential and may be omitted.

More particularly, the control circuit 200 of the present embodiment is arranged to receive signals indicative of the input voltage $V_{in}$ and the output voltage $V_{out}$ of the SMPS 100. It should be noted, however, that the signal indicative of the output voltage is not necessary if the control circuit 200 does not provide regulation of the output voltage, and the signal indicative of the input voltage is not necessary if the SMPS 100 has a regulated (and therefore constant) input voltage, as explained later. The input signals may comprise analogue signals of the voltages themselves or digital signals containing information defining voltage values measured by measurement equipment (not shown).

It will be appreciated that the control circuit 200 can be made and sold separately from the SMPS 100.

Figure 4:
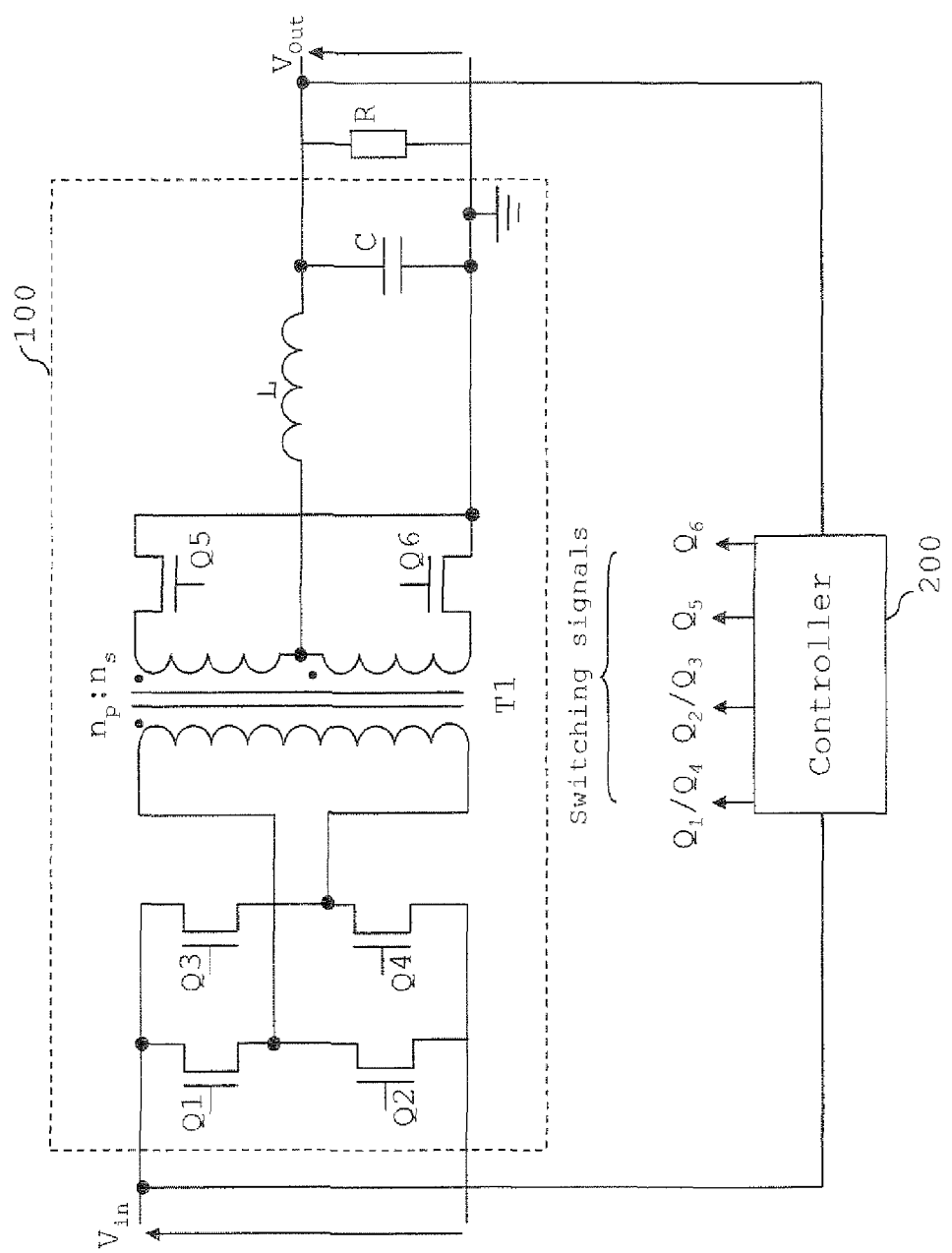
FIG. 4 is a circuit diagram showing the interconnection of the control circuit of the first embodiment with a switched mode power supply, so that the control circuit can control the duty cycle of the switched mode power supply.

FIG. 4 shows in more detail the integration of the switched mode power supply 100 with the control circuit 200 of an embodiment. In this figure, a full-bridge SMPS with center-tapped secondary side is shown, although embodiments of the present invention can be used to control other types of SMPS. Operation of the SMPS 100 is achieved through control of six switching devices, namely transistors Q1-Q6. More particularly, the circuit is directed to a DC-DC converter, using a transformer T1. An H-bridge is provided to generate an AC signal, formed from switched elements Q1-Q4. Specifically, Q1 and Q4 will initially be switched on and Q2 and Q3 switched off. This generates a positive-swinging signal across the transformer's primary coil thereby resulting in a change in magnetic flux. As a result, a voltage is induced across the transformer's secondary coil. Q6 is then switched on, and Q5 switched off to provide rectification of the signal. Similarly, the same is performed inversely to generate a negative-swinging signal, by turning Q1, Q4 and Q6 off and turning Q2, Q3 and Q5 on to capture energy from the negative portion of the cycle.

As shown in FIG. 4, and as described above with reference to FIG. 3, the control circuit 200 in the present embodiment has inputs indicative of the input voltage $V_{in}$ and output voltage $V_{out}$ of the switched mode power supply 100. Based on these inputs, as well as an internally generated duty cycle signal, the control circuit 200 generates switching signals for controlling the switching devices Q1-Q6 of the switched mode power supply 100. In the present embodiment the ground reference is at the secondary side.

Figure 5:
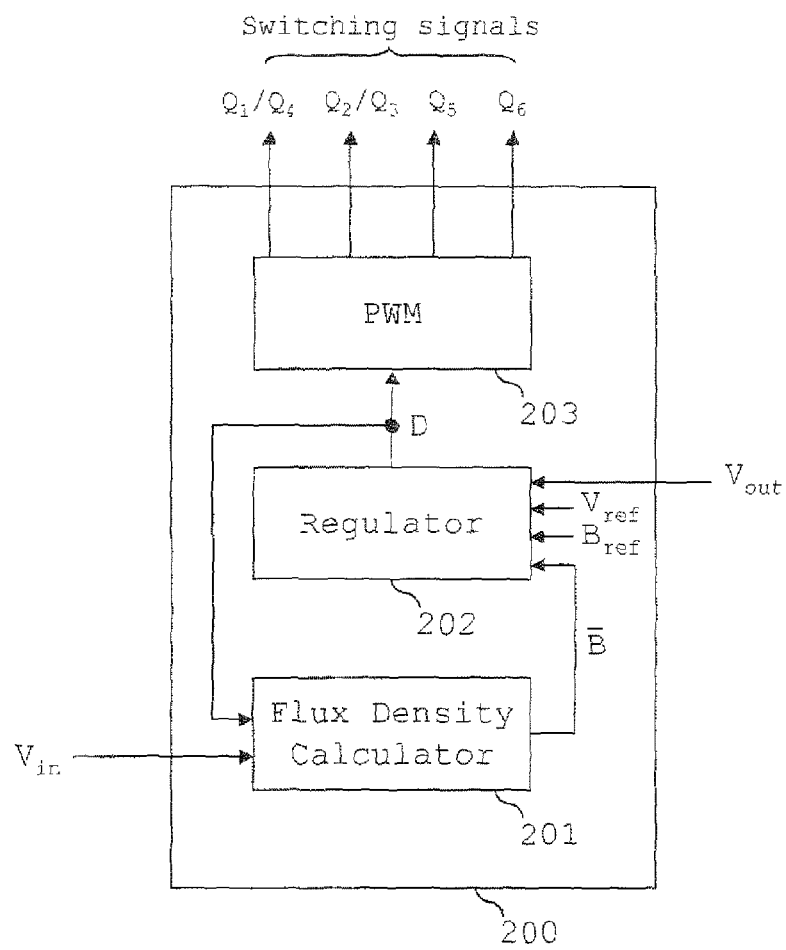
FIG. 5 is a block diagram showing further detail of the control circuit according to the first embodiment of the present invention.

FIG. 5 is a schematic block diagram of the control circuit 200 in the present embodiment. The control circuit 200 comprises a flux density calculator 201, a regulator 202 and a pulse width modulator 203 (although the pulse width modulator could be provided separate from the control circuit 200, for example as a stand-alone unit or as part of the SMPS 100).

The flux density calculator 201 is arranged to receive a feedback signal comprising a previously generated control signal D and the signal indicative of the input voltage $V_{in}$ of the switched mode power supply 100. The flux density calculator 201 is operable to generate an average flux density signal $\overline{B}$ dependent upon the fedback control signal D and the signal indicative of the input voltage $V_{in}$.

The regulator 202 is arranged to receive the generated average flux density signal $\overline{B}$ and the signal indicative of the output voltage $V_{out}$ of the switched mode power supply 100. The regulator is operable to generate the control signal D to control the duty cycle of the switched mode power supply 100 in dependence upon the average flux density signal $\overline{B}$, a reference flux density signal $B_{ref}$, the signal indicative of the output voltage $V_{out}$ of the switched mode power supply and a reference voltage signal $V_{ref}$.

In the present embodiment, the reference signals $B_{ref}$ and $V_{ref}$ are generated internally by the control circuit 200. However, it is equally possible to receive the reference signals $B_{ref}$ and $V_{ref}$ from a source external to the control circuit 200. The values of the reference signal $B_{ref}$ and $V_{ref}$ may be fixed or variable. Variable reference voltages are disclosed in co-pending PCT Application PCT/EP2011/053177 and co-pending POT Application PCT/EP2012/051429, the full contents of both of these applications being incorporated herein by cross-reference.

The pulse width modulator 203 is arranged to receive the generated control signal D and is operable to generate switching signals for switching the switching devices Q1-Q6 of the switched mode power supply 100 in dependence upon the generated control signal D.

Considering the flux density calculator 201 in more detail, there is usually no reasonable (space and cost) possibility to directly measure the magnetic flux in the transformer of a typical SMPS. Accordingly, in the present embodiment, the flux density calculator is arranged to calculate the flux density in the transformer based on a physical model. This is possible due to the high accuracy of measurement of the input voltage and arbitrary high resolution of the duty cycle in the digital implementation and the transformer's inherent damping of the magnetic flux.

Accordingly, before describing the flux density calculator 201, the underlying theory will be described. To this end the system can be divided into two sub systems:

1. The magnetic flux density of transformer core; and
2. Electrical dynamics of the capacitors and inductors These two aspects do not depend upon each other but they do have the same input, i.e., the duty cycle. This is exploited in the present embodiment to provide a simple and elegant control strategy. In the present embodiment, the magnetic flux density of the transformer core is addressed by performing magnetic flux density regulation, while the electrical dynamics of the capacitors and inductors are addressed by performing output voltage regulation (although output voltage regulation can be omitted as described previously).

The magnetic flux density B is a function of the applied voltage over the primary side transformer winding and is described by Equation 1:

$$B(t) = \frac{1}{n_p A_C} \int_0^t v_T(t) dt \qquad \text{Equation 1}$$

where, $n_p$ is the number of turns in the primary winding, $A_c$ is the area of the transformer core, and $v_T$ is the applied voltage over primary winding.

Figure 6A:
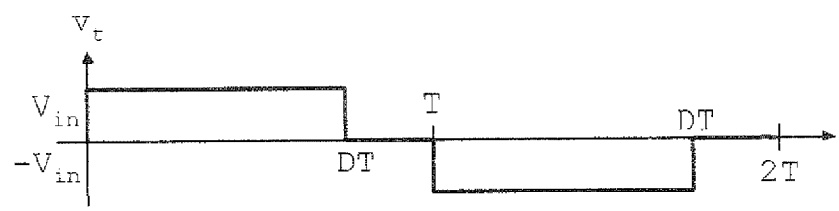
FIG. 6a shows expected changes in applied voltage to a transformer during a typical switching cycle for a full-bridge.
Figure 6B:
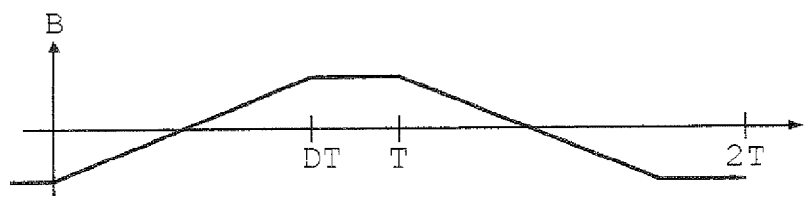
FIG. 6b shows expected changes in magnetic flux density in a transformer during a typical switching cycle for a full-bridge.

FIGS. 6a and 6b depict how the applied voltage $v_T$ and the magnetic flux density B change with time for the full-bridge converter depicted in FIG. 4.

A sampled version of Equation 1 which is combined with the applied voltage wave form in FIG. 6 produces Equation 2:

$$B(n) = \frac{1}{n_p A_C} \sum_0^n v_T(n) d(n) T_s \qquad \text{Equation 2}$$

where d(n) is the duty cycle.

Equation 2 can then be written in a recursive form as in Equation 3:

$$B(n) = B(n-1) + \frac{1}{n_p A_C} v_T(n) d(n) T_s \qquad \text{Equation 3}$$

Figure 7:
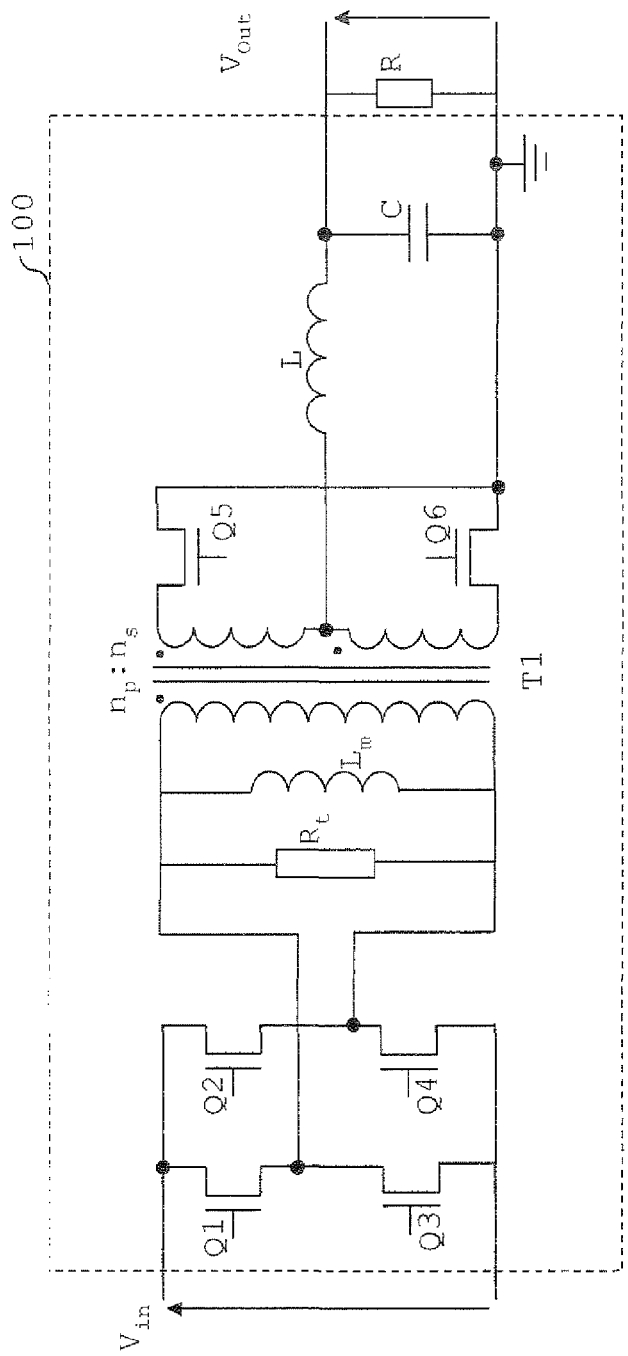
FIG. 7 shows a typical model of a switched mode power supply including the magnetising inductance and resistive damping connected to the primary side of the transformer.

Equation 3 is the ideal situation. For real world applications, it is necessary to introduce the magnetisation inductance $L_m$ and resistive damping $R_t$ of the magnetization current. A full depiction of a typical switched mode power supply, taking account of these elements, is shown in FIG. 7. In FIG. 7 the magnetization inductance $L_m$ and resistive damping $R_t$ are modelled as being connected to the primary side of the transformer.

The magnetisation current in this circuit is described by Equation 4:

$$I_m = I_0 e^{-\frac{R_t}{L_m} t} \qquad \text{Equation 4}$$

In each switch cycle $T_a$ the current is damped with the damping factor a, as shown in Equation 5:

$$a = e^{-\frac{R_t}{L_m} T_s} \qquad \text{Equation 5}$$

The magnetisation current and the magnetisation magnetic flux density are directly proportional, i.e., the magnetic flux density is also damped with the same factor. For simplicity, at this stage, a new constant is introduced as described in Equation 6:

$$c = \frac{1}{2n_p A_C} T_s \qquad \text{Equation 6}$$

Consequently, the transformer voltage, as a function of the input voltage, is described by Equation 7:

$$B(n+1) = aB(n) + c(-1)^n v_{in}(n) d(n) \qquad \text{Equation 7}$$

The magnetization inductance is given by Equation 8:

$$L_m = \frac{n_p^2 \mu A_c}{l_m} \qquad \text{Equation 8}$$

where the $l_m$ is the magnetic path length in the transformer core.

Equation 8 produces a magnetic flux density which is oscillating at the Nyquist frequency around a varying average level of the magnetic flux density $\bar{B}$. The average level is obtained by filtering out the Nyquist frequency component. This may be achieved with an average calculator, or, alternatively, any low pass filter, and is eliminated totally if the low pass filter has a zero at the Nyquist frequency, i.e. z=−1.

Figure 8:
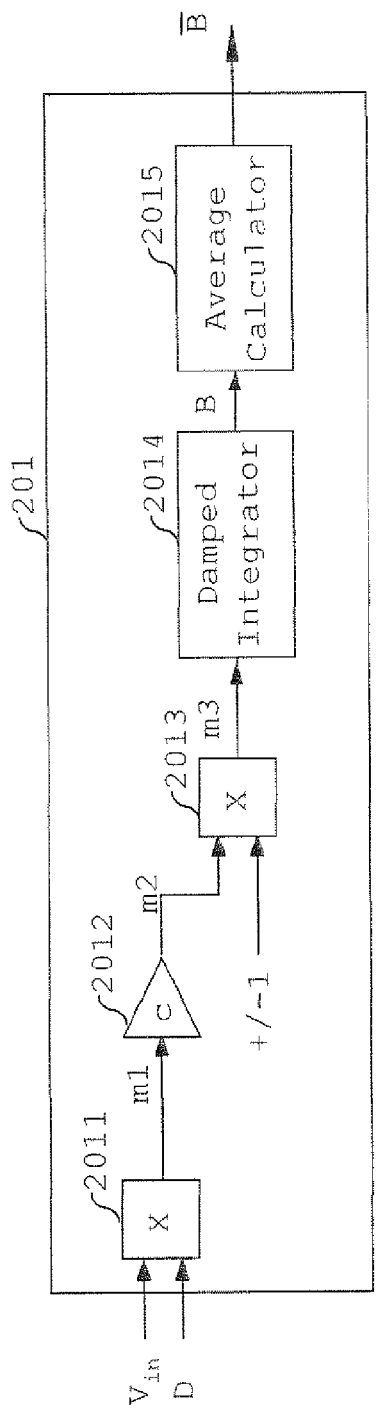
FIG. 8 is a block diagram showing further detail of the flux density calculator according to the first embodiment of the present invention.

Having explained the underlying theory, reference is now made to FIG. 8, which shows a schematic block diagram of the magnetic flux density calculator 201 according to the first embodiment of the present invention. The magnetic flux density calculator 201 comprises a first combining unit 2011, a first amplifier 2012, a second combining unit 2013, a damped integrator 2014 and an average calculator 2015. This schematic block diagram performs the operations defined by Equation 8.

The first combining unit 2011 is arranged to receive the signal indicative of the input voltage $V_{in}$ of the switched mode power supply 100 and a fedback signal comprising the control signal D generated by the regulator 202, and is operable to generate therefrom a first combination signal m1 dependent upon the signal indicative of the input voltage $V_{in}$ of the switched mode power supply 100 and the fedback control signal D. In this embodiment, the first combining unit multiplies the input voltage $V_{in}$ with the control signal D to produce $V_{in}D$.

The first amplifier 2012 is arranged to receive the first combination signal m1 and is operable to generate an amplified second combination signal m2 dependent upon the first combination signal m1. In this embodiment, the first amplifier 2012 multiplies $V_{in}D$ with the constant c to produce $cV_{in}D$.

The second combining unit 2013 is arranged to receive the second combination signal m2 and is operable to generate a third combination signal m3 dependent upon the second combination signal m2. In this embodiment, the third combining unit 2013 multiplies $cV_{in}D$ with either +/−1 where +/−1 is a train of alternating +1, −1, +1, −1, . . . . As a result, the third combining unit 2013 produces $C(-1)^n V_{in}D$.

The damped integrator 2014 is arranged to receive the third combination signal m3 and is operable to generate a magnetic flux density signal B dependent upon the third combination signal m3. In this embodiment, the damped integrator in effect sums the third combination signal m3 with previous signals, recreating the sampled nature of Equation 8.

The average calculator 2015 is operable to receive the magnetic flux density signal B and is operable to generate an average flux density signal ($\bar{B}$) dependent upon the flux density signal (B).

Figure 9:
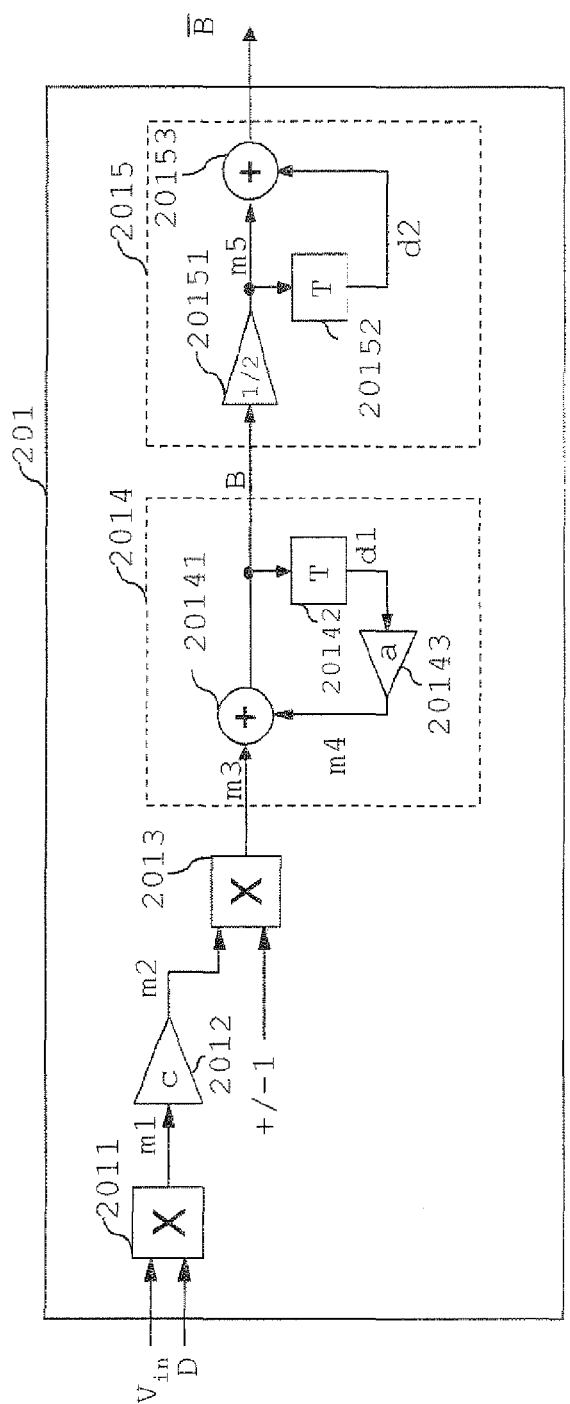
FIG. 9 is a block diagram showing yet further detail of the flux density calculator according to the first embodiment of the present invention.

FIG. 9 depicts in more detail the components of the damped integrator 2014 and the average calculator 2015 in the present embodiment.

The damped integrator 2014 comprises a first combining unit 20141, a time delay unit 20142 and an amplifier 20143.

The combining unit 20141 is arranged to receive the third combination signal m3 and a fedback fourth combination signal m4 and is operable to generate a flux density signal B dependent upon the third multiplied signal m3 and the fedback fourth combination signal m4.

The time delay unit 20142 is arranged to receive the generated magnetic flux density signal B and is operable to generate a first time-delayed magnetic flux density signal d1 comprising a time-delayed version of the magnetic flux density signal B.

The amplifier 20143 is arranged to receive the first time-delayed magnetic flux density signal d1 and is operable to generate the fourth combination signal m4 comprising an amplified version of the first time delayed flux density signal d1. In this embodiment, the multiplier unit 20143 generates aB(n), as described in Equation B. This is then added by the combining unit 20141 to $c(-1)^n V_{1n}D$ to produce the next iterative value of 9 i.e. B(n+1).

The average calculator 2015 comprises an amplifier 20151, a time delay unit 20152 and a combining unit 20153.

The amplifier 20151 is arranged to receive the generated flux density signal B and is operable to generate a fifth combination signal m5 dependent upon the generated flux density signal B. More particularly, in this embodiment, the amplifier 20151 amplifies the signal B by a factor of ½ so as to reduce the signal level by 50%.

The time delay unit 20152 is arranged to receive the fifth combination signal m5 and is operable to generate a second time-delayed combination signal d2 comprising a time-delayed version of the fifth combination signal m5.

The combining unit 20153 is arranged to receive the fifth combination signal m5 and the second time-delayed combination signal d2 and is operable to generate an average flux density signal $\bar{B}$ dependent upon the fifth combination signal m5 and the second time delayed combination signal d2. In this embodiment, the combining unit 20153 is arranged to add the fifth combination signal M5 and the second time delayed combination signal d2, but the signals can be combined in other ways.

This implements the most simple low pass filter which has a zero at z=−1, namely a one order Moving Average filter. The low group delay of a ½ sample in this filter makes it suitable for use in control systems.

Figure 10:
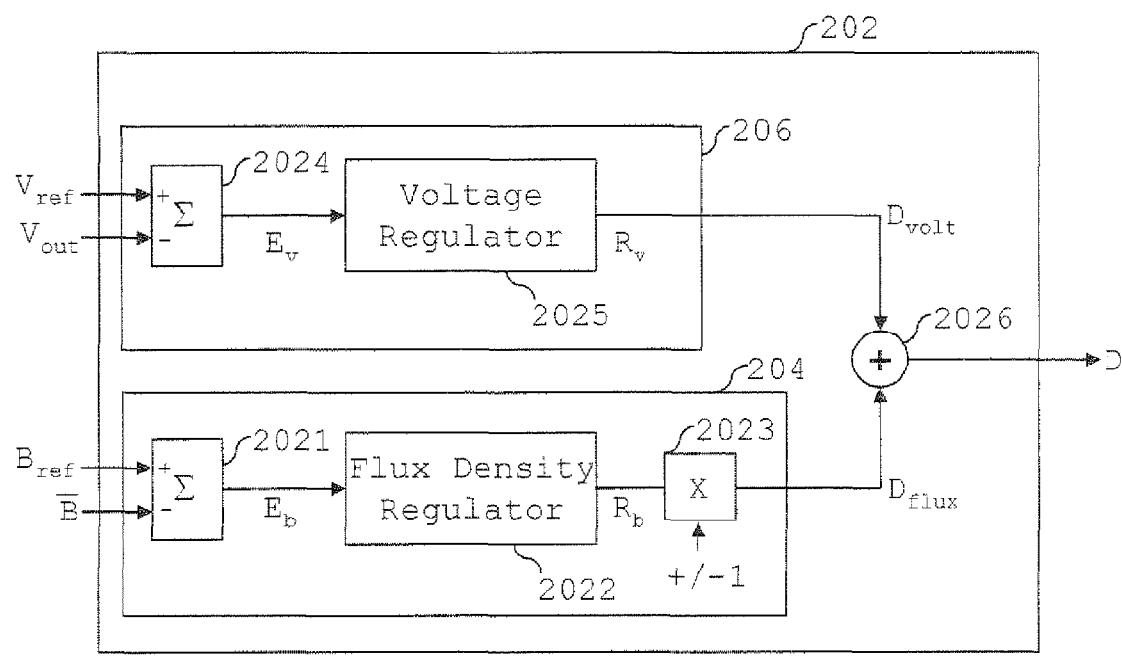
FIG. 10 is a block diagram showing further detail of the regulator according to the first embodiment of the present invention.

Turning now to the regulator 202, FIG. 10 depicts a schematic block diagram of the regulator 202 in the present embodiment. As noted previously, the regulator in the present embodiment performs both magnetic flux density regulation and also output voltage regulation, although the output voltage regulation is not essential.

Referring to FIG. 10, the regulator 202 comprises a flux density regulation circuit 204 operable to generate a duty cycle control signal $D_{flux}$ to regulate magnetic flux density, a voltage regulation circuit 206 operable to generate a duty cycle control signal $D_{volt}$ to regulate output voltage, and a combining unit 2026 operable to combine $D_{flux}$ and $D_{volt}$ to generate an overall duty cycle control signal D. The flux density regulation circuit 204 and the voltage regulation circuit 206 are arranged to operate in parallel.

The flux density regulation circuit 204 comprises a magnetic flux comparator 2021, a magnetic flux density regulator 2022 and, in this embodiment, a combining unit 2023.

The voltage regulation circuit 206 comprises a voltage comparator 2024 and a voltage regulator 2025.

The flux density regulator 2022 and the voltage regulator 2025 can be of any standard type, for example PT, PID, or PD. The flux density regulator 2022 does not have to include an integrator since, an almost perfect integrator is already included in the flux density calculator 201, since the constant a≈1.

The magnetic flux comparator 2021 is arranged to receive the average magnetic flux density signal $\overline{B}$ generated by the flux density calculator 201 and the reference magnetic flux density signal $B_{ref}$ and is operable to generate a magnetic flux error signal $E_b$ comprising a difference between the average magnetic flux density signal $\overline{B}$ and the reference magnetic flux density signal $B_{ref}$.

The magnetic flux density regulator 2022 is arranged to receive the generated magnetic flux error signal $E_b$ and is operable to generate a regulated magnetic flux density signal $R_b$ dependent upon the magnetic flux error signal $E_b$.

The combining unit 2023 is arranged to receive the regulated magnetic flux density signal $R_b$ and is operable to generate the control signal $D_{flux}$ for controlling the duty cycle of the switched mode power supply 100 to regulate the magnetic flux density in the transformer.

More particularly, due to the oscillating behaviour of the magnetic flux density the compensation of the duty cycle from the flux density regulator 2022 is alternating in sign. Therefore, to compensate, combining unit 2023 multiplies the output signal of the flux density regulator 2022 by a +/−1 pulse train thereby alternating the sign of the signal from the flux density regulator 2022. As an alternative, the multiplication by the +/−1 pulse train can be implemented by an alternating addition/subtraction. Usually the desired DC-level of the flux is zero, $B_{ref}=0$, and hence the corresponding subtraction can be removed. The negative sign of the average magnetic flux density signal $\overline{B}$ can be incorporated in the flux density regulator 2022.

Turning to the voltage regulation circuit 206, the voltage comparator 2024 is arranged to receive the signal $V_{out}$ indicative of the output voltage of the switched mode power supply 100 and the reference voltage signal. $V_{ref}$ and is operable to generate a voltage error signal $E_v$ comprising a difference between the output voltage $V_{out}$ of the switched mode power supply 100 and the reference voltage signal $V_{ref}$.

The voltage regulator 2024 is arranged to receive the generated voltage error signal and is operable to generate a duty cycle control signal $D_{volt}$ for regulating the output voltage dependent upon the voltage error signal $E_v$.

The combining unit 2026 is arranged to receive the signal $D_{flux}$ output from the multiplication unit 2023 and the signal $D_{volt}$ output from the voltage regulator 2025 and is operable to generate therefrom the overall control signal D for controlling the switched mode power supply 100. In the present embodiment, combining unit 2026 adds $D_{flux}$ and $D_{volt}$, although different ways of combining these signals could be employed instead.

It will be appreciated that the control strategy of regulator 202 uses two parallel controllers, one for the voltage control and the other for the flux density control and then simply combines the results.

Figure 11:
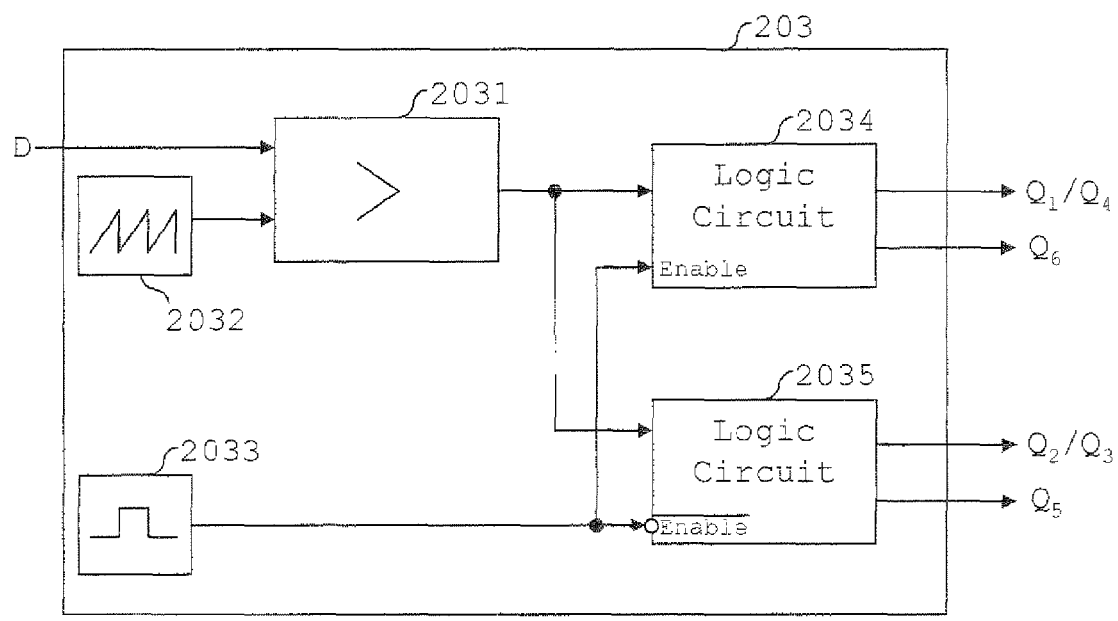
FIG. 11 is a block diagram showing further detail of the pulse width modulator according to the first embodiment of the present invention.

Turning now to the pulse width modulator 203, FIG. 11 depicts a schematic block diagram of the components of pulse width modulator (PWM) 203 in this embodiment. The PWM 203 is a digital pulse width modulator that translates the overall duty cycle signal D to pulses that control the switching devices Q1-Q6 in the switched mode power supply 100.

The pulse width modulator 203 comprises a comparison unit 2031, a sawtooth oscillator 2032, a square wave oscillator 2033 and logic circuits 2034 and 2035.

The comparison unit 2031 is operable to output a logic high as long as the input value of the control signal D is larger than the signal output from the sawtooth oscillator 2032. Otherwise, the comparison unit 2031 outputs a logic low.

The sawtooth oscillator 2032 is arranged to run at the switching frequency, $f_a$.

The square wave oscillator 2033 is arranged to run at half the switching frequency and is operable to enable the switch output pairs Q1/Q4, and Q2/Q3 every second time. The square wave oscillator 2033 is also used in the present embodiment to generate the +1,−1 pulses used in the flux density calculator 201 and the regulator 202.

It is important to note that the duty cycle value changes with the switching frequency. In contrast, with a symmetrical duty cycle, the duty cycle value changes with half of the switching frequency rate.

Figure 12:
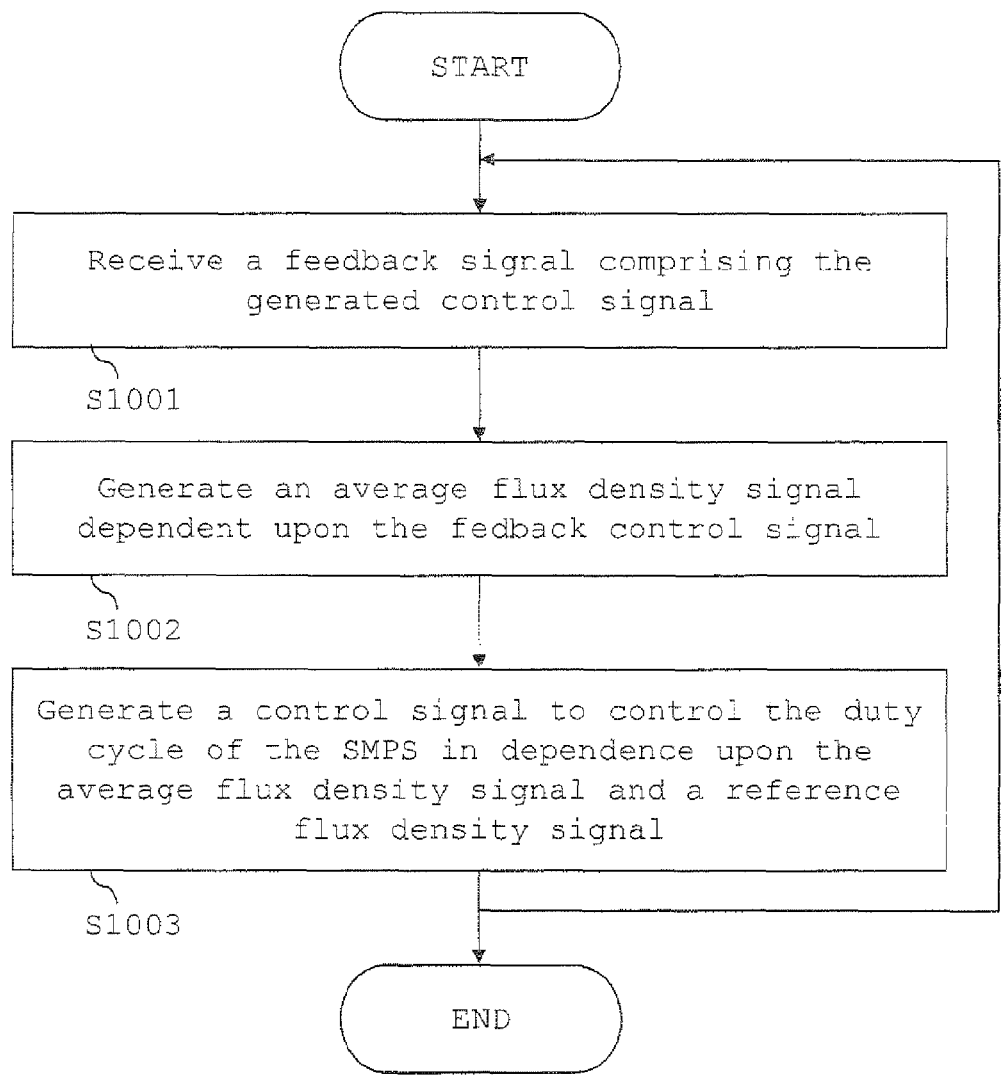
FIG. 12 is a flowchart showing the processes performed to generate the control signal according to the first embodiment of the present invention.

FIG. 12 shows a flowchart of the processing operations performed by the control circuit 200 for generating a control signal D to control the duty cycle of a switched mode power supply 100 to regulate the magnetic flux density in the transformer thereof.

Referring to FIG. 12, at step S1001, the flux density calculator 201 receives a feedback signal comprising the previously generated control signal (D).

At step S1002, the flux density calculator 201 generates an average flux density signal (B) dependent upon the fedback control signal (D).

At step S1003, the regulator 202 generates a control signal D to control the duty cycle of the switched mode power supply 100 in dependence upon the average flux density signal $\overline{B}$ and a reference flux density signal $B_{ref}$.

Experimental Results

In order to evaluate the performance improvement of a switched mode power supply regulated by a control circuit 200 of the embodiment described above, the inventors have performed simulation experiments. The experiments were designed to compare the performance of the SMPS 100 controlled using a control circuit 200 according to an embodiment of the present invention with (i) SMPSs with asymmetric duty cycles and unregulated flux densities and (ii) SMPSs with symmetrical duty cycles.

The maximum output current was 30 A, at an output voltage of 12V. The simulations are performed in Simulink. The input voltage used was 54V with a transformer ratio of 3:1. The load transients used for evaluation was a square wave with the amplitudes 10-30-10 A and not synchronized with the switching frequency.

The voltage control loop was designed using real zeros and placing one zero at the resonance frequency of the output filter of the SMPS. The other zero was placed one octave below. This yields a good transient behaviour and robustness for component variations. The gain was adjusted to obtain a well-damped transient response with minimum over/undershoot for the asymmetrical duty cycle case. The gain of the voltage loop affects the size of the flux density deviations during transients. Hence, the maximum voltage loop gain was not only limited by the standard stability requirements (gain and phase margins) but also by the maximum allowed flux density deviation.

The simulations used the same zero placement strategy for the standard symmetrical duty cycle system. In order to obtain a stable system the gain had to be decreased 6 dB compared with the non-symmetrical duty cycle system. However, the stability margin is still smaller than the systems with non-symmetrical duty cycle, which is shown in the oscillatory behaviour of duty cycles illustrated in FIGS. 13a-13c.

Figure 13A:
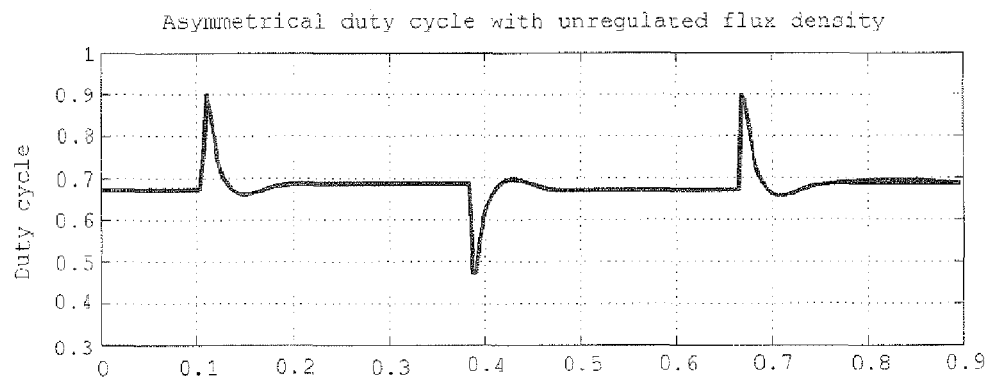
FIG. 13a shows experimental results of the variation in duty cycle for a control circuit with an asymmetric duty cycle and unregulated flux density.

FIG. 13a shows the changing duty cycle using a control circuit with an asymmetrical duty cycle and unregulated flux density.

Figure 13B:
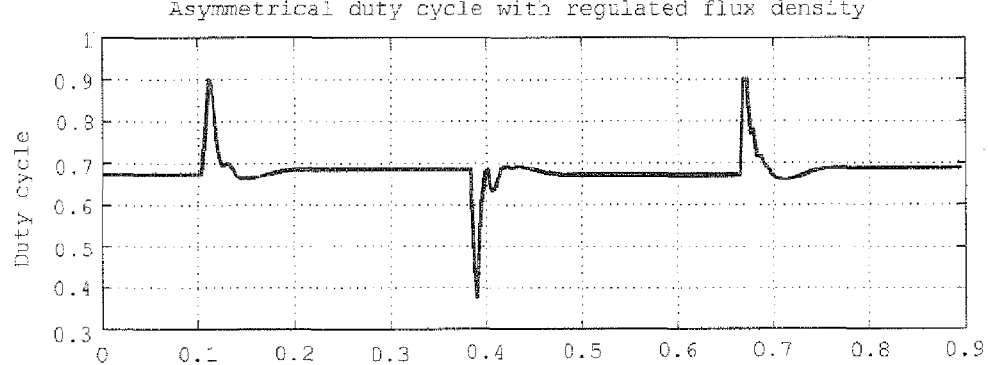
FIG. 13b shows experimental results of the variation in duty cycle for a control circuit with an asymmetric duty cycle and flux density regulated in accordance with the first embodiment.
Figure 13C:
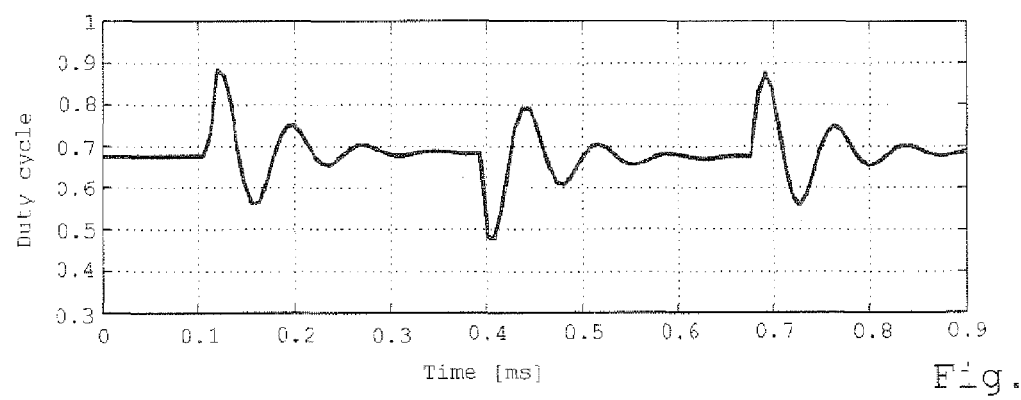
FIG. 13c shows experimental results of the variation in duty cycle for a control circuit with a symmetric duty cycle.

FIG. 13b shows the changing duty cycle using a control circuit according to an embodiment of the present invention with an asymmetrical duty cycle and regulated flux density. FIG. 13c shows the changing duty cycle using a control circuit with symmetrical duty cycle.

Next, changing magnetic flux densities were investigated with the flux density regulator 2022 being a PD-regulator. The integral part is not needed due to the inherent integrator in the flux density calculator 201. The Flux density regulator 2022 is designed for a minimum overshoot and minimum of oscillations.

Figure 14A:
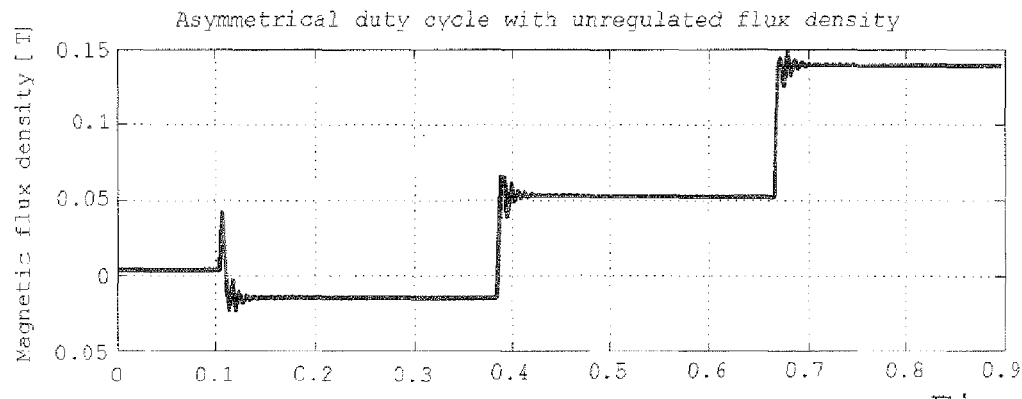
FIG. 14a shows experimental results of the variation in magnetic flux density for a control circuit with an asymmetric duty cycle and unregulated flux density.
Figure 14B:
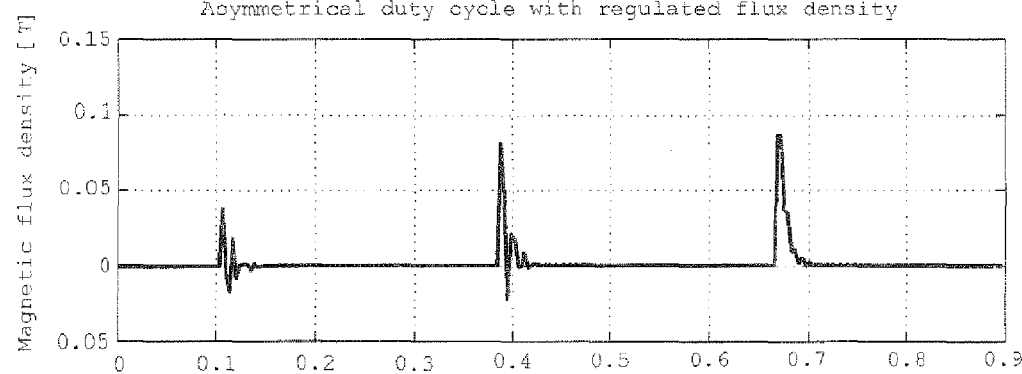
FIG. 14b shows experimental results of the variation in magnetic flux density for a control circuit with an asymmetric duty cycle and flux density regulated in accordance with the first embodiment.
Figure 14C:
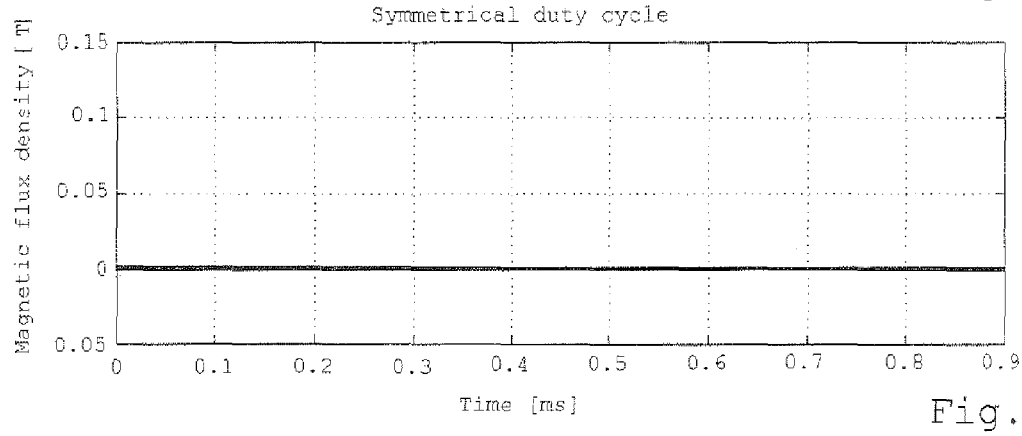
FIG. 14c shows experimental results of the variation in magnetic flux density for a control circuit with a symmetric duty cycle.

A comparison of the flux density for the three different systems is shown in FIGS. 14a-14c.

FIG. 14a shows the changing magnetic flux density using a control circuit with an asymmetric duty cycle and unregulated flux density. As showing in FIG. 14a, in this type of system, the flux density will change at every disturbance.

FIG. 14b shows the changing magnetic flux density using a control circuit according to an embodiment of the present invention, with an asymmetric duty cycle and regulated flux density. As shown in FIG. 14b, by using the control circuit of an embodiment, the maximum deviation is reduced and quickly regulated to zero, making the system ready for another transient.

FIG. 14c shows the changing magnetic flux density using a control circuit with a symmetrical duty cycle where the flux density is constant and equal to zero.

Figure 15A:
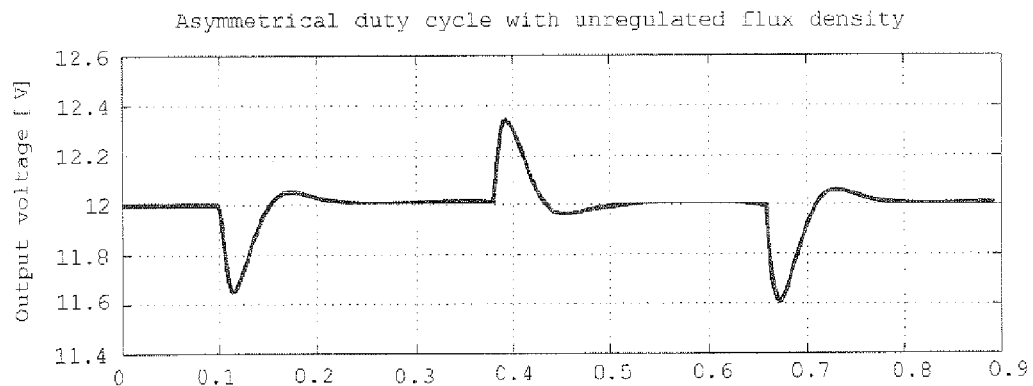
FIG. 15a shows experimental results of the variation in output voltage for a control circuit with an asymmetric duty cycle and unregulated flux density.
Figure 15B:
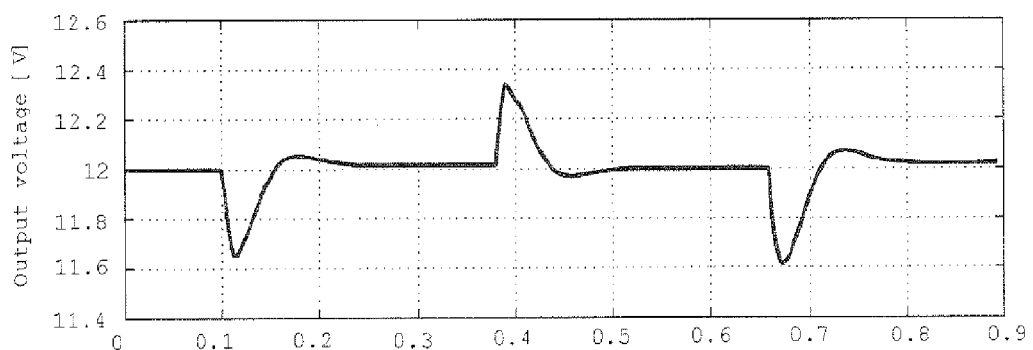
FIG. 15b shows experimental results of the variation in output voltage for a control circuit with an asymmetric duty cycle and flux density regulated in accordance with a first embodiment.
Figure 15C:
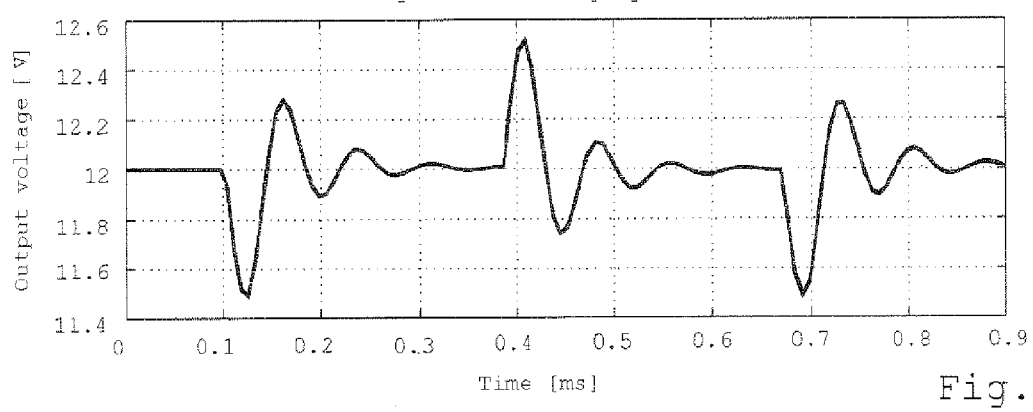
FIG. 15c shows experimental results of the variation in output voltage for a control circuit with a symmetric duty cycle.

The output voltages of the different systems are compared in FIGS. 15a-15c.

FIG. 15a shows the changing output voltage with a control circuit producing an asymmetric duty cycle with unregulated flux density for a load transient.

FIG. 15b shows the changing output voltage with a control circuit according to an embodiment of the present invention producing an asymmetric duty cycle with regulated flux density for a load transient.

FIG. 15c shows the changing output voltage with a symmetric duty cycle for a load transient.

Even with the aggressive voltage control loop for the symmetrical duty cycle case, the voltage deviation is 0.5 V compared with 0.4 V for the non-symmetrical duty cycle case, i.e., a 20 percent decrease of the voltage deviation. Adding regulation of the flux density to the non-symmetrical duty cycle case has a very minor affect on the voltage deviation. The maximum voltage deviation is very similar. However, the recovery time is somewhat increased.

[Modifications and Variants]

Many modifications and variations can be made to the embodiment described above, without departing from the scope of the present invention.

For example, the pulse width modulator 203 can be implemented within the control circuit 200, as a separate unit, or within the switched mode power supply 100.

The control circuit 200 of the above described embodiments is a separate unit which provides control signals for controlling the duty cycle of the SMPS 100. However, instead, the control circuit 200 may be incorporated within the SMPS 100.

The proposed control structure in the embodiment described above can be replaced by state-space control using any suitable feed back design technique, such as Least Quadratic Gaussian control, LQG control.

Figure 16:
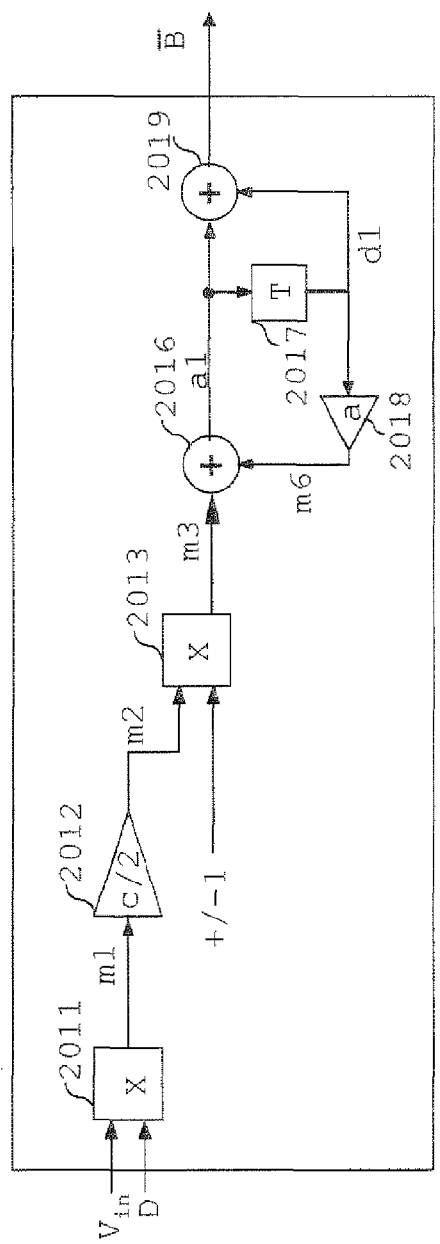
FIG. 16 shows a modification to the flux density calculator of the first embodiment, in which the damped integrator and the average calculator are combined.

Referring to the damped integrator 2014 and the average calculator 2015 shown in FIG. 8, by interchanging the order of linear operations performed by the flux density calculator 201 then a simplified circuit may be obtained, as shown in FIG. 16. The first order linear filter can be of any realised type, i.e., direct form 1 or 2, or the transposed direct forms or similar. This merged integrator with the first order moving average filter equals an integration of trapezoidal type.

In the circuit of FIG. 16, the multiplication with alternating +/−1 can be implemented by alternatively multiplying with −c/2 or +c/2, or changing the addition operation to a subtraction. Which solution is the optimal depends on the technology used for realization. Similarly, the multiplication with alternating +/−1 in the circuits FIGS. 8, 9 and 10 can be alternatively implemented.

As depicted in FIG. 16, the damped integrator 2014 and average calculator 2015 have effectively been combined using components 2016-2019. As a result, fewer components are required. Furthermore, the amplifier 2012 now amplifies by c/2 instead of c, as in the circuit of FIG. 9.

Figure 17:
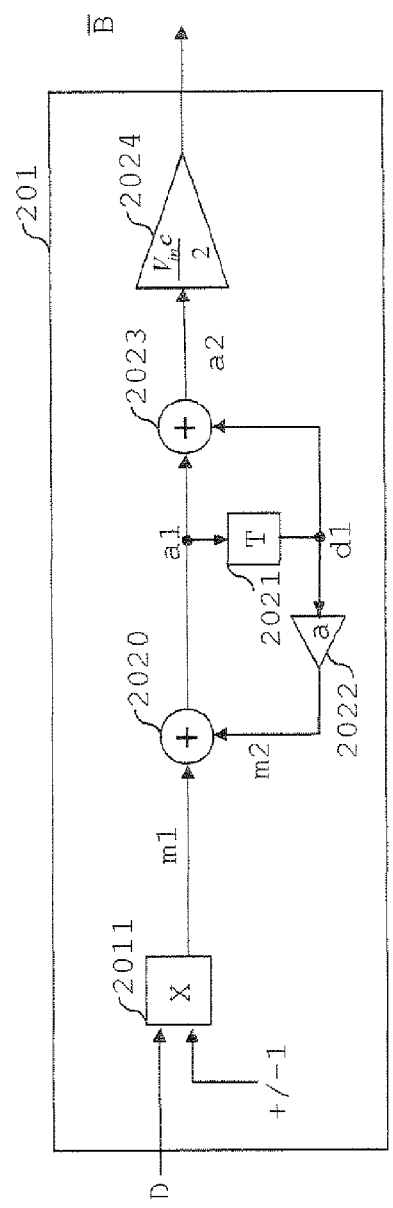
FIG. 17 shows a modification to the flux density calculator of the first embodiment for use when controlling an SMPS with a regulated input voltage.

In the embodiment described above, the input voltage to the SMPS is unregulated. However, in systems with regulated input voltages the flux density calculator 201 can be simplified. More particularly, under the assumption that the input voltage is constant, the (x by y) multiplication can be removed and merged with the constant amplification as shown in FIG. 17. Further, by placing the amplifier 2024 at the output of the flux density calculator 201 it can be merged with the gain multiplier within the flux density regulator 2022. This simplifies the system significantly.

Other modifications are, of course, possible.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A control circuit operable to generate a control signal to control a duty cycle of a switched mode power supply, the control circuit comprising:
    a flux density calculator operable to receive a feedback signal comprising the generated control signal and operable to receive a signal indicative of an input voltage of the switched mode power supply to generate a first combination signal that is dependent upon the signal indicative of the input voltage and the feedback signal and further to generate a flux density signal dependent upon the first combination signal, wherein the flux density calculator is further operable to generate an average flux density signal dependent upon the flux density signal, and wherein the average flux density signal is indicative of transformer core flux density of a transformer utilized in the switched mode power supply; and
    a regulator operable to receive the generated average flux density signal and operable to generate the control signal to control the duty cycle of the switched mode power supply in dependence upon the average flux density signal and a reference flux density signal, wherein the control signal is operable to control switching of switching devices of the switched mode power supply to adjust the duty cycle to maintain a balanced transformer core flux density.

2. The control circuit according to claim 1, wherein the regulator comprises:

a flux comparator operable to receive the average flux density signal and the reference flux density signal and operable to generate a flux density error signal dependent upon the average flux density signal and the reference flux density signal; and a flux density regulator operable to receive the flux density error signal and operable to generate the control signal to control the duty cycle of the switched mode power supply dependent upon the flux density error signal.

3. The control circuit according to claim 1, further comprising:

a pulse width modulator operable to receive the generated control signal and operable to generate switching signals for controlling the switching of the switching devices of the switched mode power supply in dependence upon the generated control signal.

4. The control circuit according to claim 1, wherein the regulator is operable to receive a signal indicative of an output voltage of the switched mode power supply and is operable to generate the control signal in dependence upon the average flux density signal, the reference flux density signal, the signal indicative of the output voltage and a reference voltage signal.

5. The control circuit according to claim 4, wherein the regulator comprises:

a flux density regulation circuit comprising:

a flux comparator operable to receive the average flux density signal and the reference flux density signal and operable to generate a flux density error signal dependent upon the average flux density signal and the reference flux density signal; and the flux density regulator operable to receive the flux density error signal and operable to generate a flux density control signal dependent upon the flux density error signal;

a voltage regulation circuit comprising:

a voltage comparator operable to receive the signal indicative of the output voltage of the switched mode power supply and the reference voltage and operable to generate a voltage error signal dependent upon the signal indicative of the output voltage and the reference voltage; and a voltage regulator operable to receive the voltage error signal and operable to generate a voltage control signal dependent upon the voltage error signal; and a combining unit operable to combine the flux density control signal and the voltage control signal to generate the control signal to control the duty cycle of the switched mode power supply.

6. The control circuit according to claim 5, wherein the flux density regulation circuit and the voltage regulation circuit are arranged to generate the flux density control signal and the voltage control signal in parallel.

7. The control circuit according to claim 1, wherein the flux density calculator comprises:

a first combining unit operable to receive the signal indicative of the input voltage of the switched mode power supply and the feedback signal comprising the generated control signal and operable to generate the first combination signal dependent upon the signal indicative of the input voltage of the switched mode power supply and the feedback control signal;

a damped integrator operable to receive the first combination signal and operable to generate the flux density signal dependent upon the first combination signal; and an average calculator operable to receive the flux density signal and operable to generate the average flux density signal dependent upon the flux density signal.

8. The control circuit according to claim 7, wherein the damped integrator and average calculator comprise:

a second combining unit operable to receive the first combination signal and a first time-delayed combination signal and operable to combine the signals to generate a second combination signal dependent upon the first combination signal and the first time-delayed combination signal;

a time delay unit operable to receive the second combination signal and operable to generate the first time-delayed combination signal dependent upon the second combination signal; and a third combining unit operable to receive the second combination signal and a second time-delayed combination signal and operable to combine the signals to generate the average flux density signal dependent upon the second combination signal and the second time-delayed combination signal.

9. A switched mode power supply having a control circuit, wherein the control circuit is operable to generate a control signal to control a duty cycle of the switched mode power supply, the control circuit comprising:

a flux density calculator operable to receive a feedback signal comprising the generated control signal and operable to receive a signal indicative of an input voltage of the switched mode power supply to generate a combination signal that is dependent upon the signal indicative of the input voltage and the feedback signal and further to generate a flux density signal dependent upon the combination signal, wherein the flux density calculator is further operable to generate an average flux density signal dependent upon the flux density signal, and wherein the average flux density signal is indicative of transformer core flux density of a transformer utilized in the switched mode power supply; and a regulator operable to receive the generated average flux density signal and operable to generate the control signal to control the duty cycle of the switched mode power supply in dependence upon the average flux density signal and a reference flux density signal, wherein the control signal is operable to control switching of switching devices of the switched mode power supply to adjust the duty cycle to maintain a balanced transformer core flux density.

10. A method of generating a control signal to control a duty cycle of a switched mode power supply, the method comprising:

receiving a feedback signal comprising the generated control signal;

receiving a signal indicative of an input voltage of the switched mode power supply;

generating a first combination signal dependent upon the signal indicative of the input voltage and the feedback signal;

generating a flux density signal dependent upon the first combination signal;

generating an average flux density signal dependent upon the flux density signal, wherein the average flux density signal is indicative of transformer core flux density of a transformer utilized in the switched mode power supply; and generating the control signal to control the duty cycle of the switched mode power supply in dependence upon the average flux density signal and a reference flux density signal, wherein the control signal is operable to control switching of switching devices of the switched mode power supply to adjust the duty cycle to maintain a balanced transformer core flux density.

11. The method according to claim 10, wherein the generation of the control signal comprises:
    generating a flux density error signal dependent upon the average flux density signal and the reference flux density signal; and
    generating the control signal in dependence upon the flux density error signal.

12. The method according to claim 10, further comprising:
    generating switching signals for controlling the switching devices of the switched mode power supply in dependence upon the generated control signal.

13. The method according to claim 10, further comprising:
    receiving a signal indicative of an output voltage of the switched mode power supply; and
    generating the control signal in dependence upon the average flux density signal, the reference flux density signal, the signal indicative of the output voltage and a reference voltage signal.

14. The method according to claim 13, wherein the generation of the control signal comprises:
    generating a flux density control signal by:
        generating a flux density error signal dependent upon the average flux density signal and the reference flux density signal; and
        generating the flux density control signal dependent upon the flux density error signal;
    generating a voltage control signal by:
        generating a voltage error signal dependent upon the signal indicative of the output voltage of the switched mode power supply and the reference voltage; and
        generating the voltage control signal dependent upon the voltage error signal; and
    combining the flux density control signal and the voltage control signal to generate the control signal to control the duty cycle of the switched mode power supply.

15. The method according to claim 14, wherein the flux density control signal and the voltage control signal are generated in parallel.

16. The method according to claim 10, wherein the generation of the flux density signal and the average flux density signal comprise:
    generating a second combination signal dependent upon the first combination signal and a time-delayed combination signal;
    generating the time-delayed combination signal dependent upon the second combination signal; and
    generating the average flux density signal dependent upon the second combination signal and a second time-delayed combination signal.

* * * * *